US009811752B2

(12) United States Patent
Yamamoto

(10) Patent No.: US 9,811,752 B2
(45) Date of Patent: Nov. 7, 2017

(54) WEARABLE SMART DEVICE AND METHOD FOR REDUNDANT OBJECT IDENTIFICATION

(71) Applicant: Toyota Motor Engineering & Manufacturing North America, Inc., Erlanger, KY (US)

(72) Inventor: Kenichi Yamamoto, San Jose, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 80 days.

(21) Appl. No.: 14/644,086

(22) Filed: Mar. 10, 2015

(65) Prior Publication Data
US 2016/0267344 A1     Sep. 15, 2016

(51) Int. Cl.
G06F 1/16      (2006.01)
G06K 9/00     (2006.01)
G06K 9/32     (2006.01)

(52) U.S. Cl.
CPC .......... G06K 9/3241 (2013.01); G06F 1/163 (2013.01); G06K 9/00201 (2013.01); G06K 9/00228 (2013.01); G06K 2209/21 (2013.01)

(58) Field of Classification Search
CPC .............. G06F 17/30247; G06F 1/163; G06K 9/00617; G06K 9/00288; G06K 9/00302;
(Continued)

(56) References Cited

U.S. PATENT DOCUMENTS 4,520,501 A    5/1985  DuBrucq
4,586,827 A    5/1986  Hirsch et al.
(Continued)

FOREIGN PATENT DOCUMENTS

CN    201260746    6/2009
CN    101527093    9/2009
(Continued)

OTHER PUBLICATIONS

Cardonha et al.; "A Crowdsourcing Platform for the Construction of Accessibility Maps"; W4A'13 Proceedings of the 10th International Cross-Disciplinary Conference on Web Accessibility; Article No. 26; 4 pages; 2013.
(Continued)

Primary Examiner — Kenny Cese
(74) Attorney, Agent, or Firm — Snell & Wilmer L.L.P.

(57) ABSTRACT

A wearable smart device includes a sensor configured to detect data corresponding to a detected object, a memory configured to store a contact list including contact information for a plurality of contact devices and to store stored data corresponding to a plurality of stored objects, an antenna and a processor. The processor is programmed to determine whether the detected object can be identified by comparing the detected data to the stored data, to transmit the detected data to at least one of the plurality of contact devices via the antenna in response to not being able to identify the detected object by comparing the detected data to the stored data and to receive an identification of the detected object from the at least one of the plurality of contact devices. The wearable smart device also includes an output unit to output the identification of the detected object.

13 Claims, 8 Drawing Sheets

(58) Field of Classification Search
CPC ............. G06K 9/3241; G06K 9/00201; G06K 2209/21
See application file for complete search history.

(56) References Cited

U.S. PATENT DOCUMENTS

| | | |
|---|---|---|
| 4,786,966 A | 11/1988 | Hanson |
| 5,047,952 A | 9/1991 | Kramer |
| 5,097,856 A | 3/1992 | Chi-Sheng |
| 5,129,716 A | 7/1992 | Holakovsky et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini |
| 7,501,958 B2 | 3/2009 | Saltzstein et al. |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori |
| 8,797,141 B2 | 8/2014 | Best et al. |
| 8,797,386 B2 | 8/2014 | Chou et al. |
| 8,803,699 B2 | 8/2014 | Foshee et al. |
| 8,814,019 B2 | 8/2014 | Dyster et al. |
| 8,825,398 B2 | 9/2014 | Alexandre |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| D727,194 S | 4/2015 | Wilson |
| 9,004,330 B2 | 4/2015 | White |
| 9,025,016 B2 | 5/2015 | Wexler et al. |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson |
| D736,741 S | 8/2015 | Katz |
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,190,058 B2 | 11/2015 | Klein |
| 9,230,430 B2 | 1/2016 | Civelli et al. |

(56) References Cited

U.S. PATENT DOCUMENTS

| | | |
|---|---|---|
| 9,232,366 B1 | 1/2016 | Charlier et al. |
| 9,267,801 B2 | 2/2016 | Gupta et al. |
| 9,269,015 B2 | 2/2016 | Boncyk |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourguet |
| 2003/0026461 A1 | 2/2003 | Arthur Hunter |
| 2003/0133085 A1 | 7/2003 | Tretiakoff |
| 2003/0179133 A1 | 9/2003 | Pepin et al. |
| 2004/0232179 A1 | 11/2004 | Chauhan |
| 2004/0267442 A1 | 12/2004 | Fehr et al. |
| 2005/0208457 A1 | 9/2005 | Fink et al. |
| 2005/0221260 A1 | 10/2005 | Kikuchi |
| 2006/0004512 A1 | 1/2006 | Herbst |
| 2006/0028550 A1 | 2/2006 | Palmer |
| 2006/0029256 A1 | 2/2006 | Miyoshi |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0202865 A1 * | 8/2007 | Moride ................ H04W 88/06 455/419 |
| 2007/0230786 A1 | 10/2007 | Foss |
| 2007/0296572 A1 | 12/2007 | Fein |
| 2008/0024594 A1 | 1/2008 | Ritchey |
| 2008/0068559 A1 | 3/2008 | Howell |
| 2008/0120029 A1 | 5/2008 | Zelek et al. |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 * | 8/2009 | Furuya ................ G06F 13/4247 710/110 |
| 2010/0041378 A1 | 2/2010 | Aceves |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar |
| 2010/0198494 A1 | 8/2010 | Chao |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Patrou |
| 2011/0181422 A1 | 7/2011 | Tran |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King, III et al. |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1 | 4/2012 | Schmidt |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0155474 A1 | 6/2013 | Roach et al. |
| 2013/0157230 A1 | 6/2013 | Morgan |
| 2013/0184982 A1 | 7/2013 | DeLuca |
| 2013/0202274 A1 | 8/2013 | Chan |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland |
| 2014/0031081 A1 | 1/2014 | Vossoughi |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0071234 A1 | 3/2014 | Millett |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0133290 A1 * | 5/2014 | Yokoo ................ H04L 1/22 370/216 |
| 2014/0184384 A1 | 7/2014 | Zhu et al. |

(56) References Cited

U.S. PATENT DOCUMENTS

| | | |
|---|---|---|
| 2014/0204245 A1 | 7/2014 | Wexler |
| 2014/0222023 A1 | 8/2014 | Kim et al. |
| 2014/0233859 A1 | 8/2014 | Cho |
| 2014/0249847 A1 | 9/2014 | Soon-Shiong |
| 2014/0251396 A1 | 9/2014 | Subhashrao et al. |
| 2014/0253702 A1 | 9/2014 | Wexler |
| 2014/0278070 A1 | 9/2014 | McGavran |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1 | 12/2014 | Miskin |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0063661 A1* | 3/2015 | Lee .................. G06F 3/011 |
| | | 382/124 |
| 2015/0081884 A1* | 3/2015 | Maguire ............ H04L 45/70 |
| | | 709/224 |
| 2015/0099946 A1* | 4/2015 | Sahin ................ A61B 5/16 |
| | | 600/301 |
| 2015/0109107 A1 | 4/2015 | Gomez et al. |
| 2015/0120186 A1 | 4/2015 | Heikes |
| 2015/0125831 A1 | 5/2015 | Chandrashekhar Nair et al. |
| 2015/0141085 A1 | 5/2015 | Nuovo et al. |
| 2015/0142891 A1 | 5/2015 | Haque |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1 | 7/2015 | Chen |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0330787 A1 | 11/2015 | Cioffi et al. |
| 2015/0336276 A1 | 11/2015 | Song |
| 2015/0341591 A1 | 11/2015 | Kelder et al. |
| 2015/0346496 A1 | 12/2015 | Haddick et al. |
| 2015/0356345 A1* | 12/2015 | Velozo .............. G06K 9/00228 |
| | | 382/103 |
| 2015/0356837 A1 | 12/2015 | Pajestka |
| 2015/0364943 A1 | 12/2015 | Vick |
| 2015/0367176 A1 | 12/2015 | Bejestan |
| 2015/0375395 A1 | 12/2015 | Kwon |
| 2016/0007158 A1 | 1/2016 | Venkatraman |
| 2016/0028917 A1* | 1/2016 | Wexler .............. G02B 27/0093 |
| | | 348/169 |
| 2016/0042228 A1 | 2/2016 | Opalka |
| 2016/0098138 A1 | 4/2016 | Park |
| 2016/0156850 A1 | 6/2016 | Werblin et al. |
| 2016/0198319 A1 | 7/2016 | Huang |
| 2016/0350514 A1 | 12/2016 | Rajendran |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 2010012529 | 1/2010 |
| JP | 2010182193 | 8/2010 |
| JP | 2013169611 | 9/2013 |
| KR | 100405636 | 11/2003 |
| KR | 20080080688 | 9/2008 |
| KR | 20120020212 | 3/2012 |
| KR | 1250929 | 4/2013 |
| WO | WO9504440 | 2/1995 |
| WO | WO 9949656 | 9/1999 |
| WO | WO 0010073 | 2/2000 |
| WO | WO 0038393 | 6/2000 |
| WO | WO 0179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/008791 | 1/2008 |
| WO | WO 2008015375 | 2/2008 |
| WO | WO 2008/035993 | 3/2008 |
| WO | WO 2008/096134 | 8/2008 |
| WO | WO2008127316 | 10/2008 |
| WO | WO 2010/062481 | 6/2010 |
| WO | WO 2010/109313 | 9/2010 |
| WO | WO 2012/040703 | 3/2012 |
| WO | WO2012163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014104531 | 7/2014 |
| WO | WO 2014/138123 | 9/2014 |
| WO | WO 2014/172378 | 10/2014 |
| WO | WO 2015065418 | 5/2015 |
| WO | WO2015092533 | 6/2015 |
| WO | WO 2015108882 | 7/2015 |
| WO | WO2015127062 | 8/2015 |

OTHER PUBLICATIONS

Bujacz et al.; "Remote Guidance for the Blind—A Proposed Teleassistance System and Navigation Trials"; 2008 Conference on Human System Interactions; pp. 888-892; 2008.

Rodriguez et al; "CrowdSight: Rapidly Prototyping Intelligent Visual Processing Apps"; AAAI Human Computation Workshop (HCOMP), pp. 49-54; 2011.

Chaudary et al.; "Alternative Navigation Assistance Aids for Visually Impaired Blind Persons";.

Garaj et al.; "A System for Remote Sighted Guidance of Visually Impaired Pedestrians"; The British Journal of Visual Impairment; vol. 21, No. 2; pp. 55-63; 2003.

Coughlan et al.; "Crosswatch: A System for Providing Guidance to Visually Impaired Travelers at Traffic Intersections"; Journal of Assistive Technologies; 7(2); 17 pages; 2013.

Sudol et al.; "LookTel—A Comprehensive Platform for Computer-Aided Visual Assistance"; Computer Vision and Pattern Recognition Workshops (CVPRW), 2010 IEEE Computer Society Conference; pp. 73-80; Jun. 13-18, 2010.

Paladugu et al.; "GoingEasy® with Crowdsourcing in the Web 2.0 World for Visually Impaired Users: Design and User Study"; 8 pages.

Kammoun et al.; *"Towards a geographic information system facilitating navigation of visually impaired users"*; Springer Berlin Heidelberg; 8 pages; 2012.

(56) References Cited

OTHER PUBLICATIONS

Bigham et al.; "VizWiz: nearly real-time answers to visual questions." *Proceedings of the 23nd annual ACM symposium on User interface software and technology*; 2 pages; 2010.
Guy et al; "CrossingGuard: exploring information content in navigation aids for visually impaired pedestrians." *Proceedings of the SIGCHI Conference on Human Factors in Computing Systems*; pp. 405-414; May 5-10, 2012.
Wu et al. "Fusing Multi-Modal Features for Gesture Recognition", Proceedings of the 15$^{th}$ ACM on International Conference on Multimodal Interaction, Dec. 9, 2013, ACM, pp. 453-459.
Pitsikalis et al. "Multimodal Gesture Recognition via Multiple Hypotheses Rescoring", Journal of Machine Learning Research, Feb. 2015, pp. 255-284.
Shen et al. "Walkie-Markie: Indoor Pathway Mapping Made Easy" 10$^{th}$ USENIX Symposium on Networked Systems Design and Implementation (NSDI'13); pp. 85-98, 2013.
Tu et al. "Crowdsourced Routing II D2.6" 34 pages; 2012.
De Choudhury et al. "Automatic Construction of Travel Itineraries Using Social Breadcrumbs" pp. 35-44; Jun. 2010.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16$^{th}$ International Symposium on Wearable Computers; pp. 166-167; 2012.
Singhal; "The Development of an Intelligent Aid for Blind and Old People;" *Emerging Trends and Applications in Computer Science (ICETACS), 2013 1$^{st}$ International Conference*; pp. 182-185; Sep. 13, 2013.
Aggarwal et al.; "All-in-One Companion for Visually Impaired;" *International Journal of Computer Applications*; vol. 79, No. 14; pp. 37-40; Oct. 2013.
"Light Detector" *EveryWare Technologies*; 2 pages; Jun. 18, 2016.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Yabu et al.; "Development of a Wearable Haptic Tactile Interface as an Aid for the Hearing and/or Visually Impaired;" *NTUT Education of Disabilities*; vol. 13; pp. 5-12; 2015.
Mau et al.; "BlindAid: An Electronic Travel Aid for the Blind;" *The Robotics Institute Carnegie Mellon University*; 27 pages; May 2008.
Shidujaman et al.; "Design and navigation Prospective for Wireless Power Transmission Robot;" IEEE; Jun. 2015.
The Nex Band; http://www.mightycast.com/#faq; May 19, 2015; 4 pages.
Zhang et al.; "*A Multiple Sensor-Based Shoe-Mounted User Interface Designed for Navigation Systems for the Visually Impaired*"; 5$^{th}$ Annual ICST Wireless Internet Conference (WICON); Mar. 1-3, 2010; 9 pages.
Shoval et al.; "*Navbelt and the Guidecane—Robotics-Based Obstacle-Avoidance Systems for the Blind and Visually Impaired*"; IEEE Robotics & Automation Magazine, vol. 10, Issue 1; Mar. 2003; 12 pages.
Dowling et al.; "*Intelligent Image Processing Constraints for Blind Mobility Facilitated Through Artificial Vision*"; 8$^{th}$ Australian and NewZealand Intelligent Information Systems Conference (ANZIIS); Dec. 10-12, 2003; 7 pages.
Heyes, Tony; "*The Sonic Pathfinder an Electronic Travel Aid for the Vision Impaired*"; http://members.optuszoo.com.au/aheyew40/pa/pf_blerf.html; Dec. 11, 2014; 7 pages.
Lee et al.; "*Adaptive Power Control of Obstacle Avoidance System Using Via Motion Context for Visually Impaired Person.*" International Conference on Cloud Computing and Social Networking (ICCCSN), Apr. 26-27, 2012 4 pages.

Wilson, Jeff, et al. "*Swan: System for Wearable Audio Navigation*"; 11th IEEE International Symposium on Wearable Computers; Oct. 11-13, 2007; 8 pages.
Borenstein et al.; "*The GuideCane—A Computerized Travel Aid for the Active Guidance of Blind Pedestrians*"; IEEE International Conference on Robotics and Automation; Apr. 21-27, 1997; 6 pages.
Bhatlawande et al.; "*Way-finding Electronic Bracelet for Visually Impaired People*"; IEEE Point-of-Care Healthcare Technologies (PHT), Jan. 16-18, 2013; 4 pages.
Blenkhorn et al.; "*An Ultrasonic Mobility Device with Minimal Audio Feedback*"; Center on Disabilities Technology and Persons with Disabilities Conference; Nov. 22, 1997; 5 pages.
Mann et al.; "*Blind Navigation with a Wearable Range Camera and Vibrotactile Helmet*"; 19$^{th}$ ACM International Conference on Multimedia; Nov. 28, 2011; 4 pages.
Shoval et al.; "*The Navbelt—A Computerized Travel Aid for the Blind*"; RESNA Conference, Jun. 12-17, 1993; 6 pages.
Kumar et al.; "*An Electronic Travel Aid for Navigation of Visually Impaired Persons*"; Communications Systems and Networks (COMSNETS), 2011 Third International Conference; Jan. 2011; 5 pages.
Pawar et al.; "*Multitasking Stick for Indicating Safe Path to Visually Disable People*"; IOSR Journal of Electronics and Communication Engineering (IOSR-JECE), vol. 10, Issue 3, Ver. II; May-Jun. 2015; 5 pages.
Pagliarini et al.; "*Robotic Art for Wearable*"; Proceedings of EUROSIAM: European Conference for the Applied Mathematics and Informatics 2010; 10 pages.
Greenberg et al.; "*Finding Your Way: A Curriculum for Teaching and Using the Braillenote with Sendero GPS 2011*"; California School for the Blind; 2011; 190 pages.
Helal et al.; "*Drishti: An Integrated Navigation System for Visually Impaired and Disabled*"; Fifth International Symposium on Wearable Computers; Oct. 8-9, 2001; 8 pages.
Parkes, Don; "*Audio Tactile Systems for Designing and Learning Complex Environments as a Vision Impaired Person: Static and Dynamic Spatial Information Access*"; EdTech-94 Proceedings; 1994; 8 pages.
Zeng et al.; "*Audio-Haptic Browser for a Geographical Information System*"; ICCHP 2010, Part II, LNCS 6180; Jul. 14-16, 2010; 8 pages.
AlZuhair et al.; "*NFC Based Applications for Visually Impaired People—A Review*"; IEEE International Conference on Multimedia and Expo Workshops (ICMEW), Jul. 14, 2014; 7 pages.
Graf, Christian; "*Verbally Annotated Tactile Maps—Challenges and Approaches*"; Spatial Cognition VII, vol. 6222; Aug. 15-19, 2010; 16 pages.
Hamid, Nazatul Naquiah Abd; "*Facilitating Route Learning Using Interactive Audio-Tactile Maps for Blind and Visually Impaired People*"; CHI 2013 Extended Abstracts; Apr. 27, 2013; 6 pages.
Ramya, et al.; "*Voice Assisted Embedded Navigation System for the Visually Impaired*"; International Journal of Computer Applications; vol. 64, No. 13, Feb. 2013; 7 pages.
Caperna et al.; "*A Navigation and Object Location Device for the Blind*"; Tech. rep. University of Maryland College Park; May 2009; 129 pages.
Burbey et al.; "*Human Information Processing with the Personal Memex*"; ISE 5604 Fall 2005; Dec. 6, 2005; 88 pages.
Ghiani, et al.; "*Vibrotactile Feedback to Aid Blind Users of Mobile Guides*"; Journal of Visual Languages and Computing 20; 2009; 13 pages.
Guerrero et al.; "*An Indoor Navigation System for the Visually Impaired*"; Sensors vol. 12, Issue 6; Jun. 13, 2012; 23 pages.
Nordin et al.; "*Indoor Navigation and Localization for Visually Impaired People Using Weighted Topological Map*"; Journal of Computer Science vol. 5, Issue 11; 2009; 7 pages.
Hesch et al.; "*Design and Analysis of a Portable Indoor Localization Aid for the Visually Impaired*"; International Journal of Robotics Research; vol. 29; Issue 11; Sep. 2010; 15 pgs.
Joseph et al.; "*Visual Semantic Parameterization—To Enhance Blind User Perception for Indoor Navigation*"; Multimedia and Expo Workshops (ICMEW), 2013 IEEE International Conference; Jul. 15, 2013; 7 pages.

(56) References Cited

OTHER PUBLICATIONS

Katz et al; "*NAVIG: Augmented Reality Guidance System for the Visually Impaired*"; Virtual Reality (2012) vol. 16; 2012; 17 pages.

Rodriguez et al.; "*Assisting the Visually Impaired: Obstacle Detection and Warning System by Acoustic Feedback*"; Sensors 2012; vol. 12; 21 pages.

Treuillet; "*Outdoor/Indoor Vision-Based Localization for Blind Pedestrian Navigation Assistance*"; WSPC/Instruction File; May 23, 2010; 16 pages.

Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.

Wang, et al.; "*Camera-Based Signage Detection and Recognition for Blind Persons*"; 13$^{th}$ International Conference (ICCHP) Part 2 Proceedings; Jul. 11-13, 2012; 9 pages.

Krishna et al.; "*A Systematic Requirements Analysis and Development of an Assistive Device to Enhance the Social Interaction of People Who are Blind or Visually Impaired*"; Workshop on Computer Vision Applications for the Visually Impaired; Marseille, France; 2008; 12 pages.

Lee et al.; "*A Walking Guidance System for the Visually Impaired*"; International Journal of Pattern Recognition and Artificial Intelligence; vol. 22; No. 6; 2008; 16 pages.

Ward et al.; "*Visual Experiences in the Blind Induced by an Auditory Sensory Substitution Device*"; Journal of Consciousness and Cognition; Oct. 2009; 30 pages.

Merino-Garcia, et al.; "*A Head-Mounted Device for Recognizing Text in Natural Sciences*"; CBDAR'11 Proceedings of the 4$^{th}$ International Conference on Camera-Based Document Analysis and Recognition; Sep. 22, 2011; 7 pages.

Yi, Chucai; "*Assistive Text Reading from Complex Background for Blind Persons*"; CBDAR'11 Proceedings of the 4$^{th}$ International Conference on Camera-Based Document Analysis and Recognition; Sep. 22, 2011; 7 pages.

Yang, et al.; "*Towards Automatic Sign Translation*"; The Interactive Systems Lab, Carnegie Mellon University; 2001; 5 pages.

Meijer, Dr. Peter B.L.; "*Mobile OCR, Face and Object Recognition for the Blind*"; The vOICe, www.seeingwithsound.com/ocr.htm; Apr. 18, 2014; 7 pages.

OMRON; Optical Character Recognition Sensor User's Manual; 2012; 450 pages.

Park, Sungwoo; "*Voice Stick*"; www.yankodesign.com/2008/08/21/voice-stick; Aug. 21, 2008; 4 pages.

Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9pages.

Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.

Glover et al.; "*A Robotically-Augmented Walker for Older Adults*"; Carnegie Mellon University, School of Computer Science; Aug. 1, 2003; 13 pages.

OrCam; www.orcam.com; Jul. 22, 2014; 3 pages.

Eccles, Lisa; "*Smart Walker Detects Obstacles*"; Electronic Design; http://electronicdesign.com/electromechanical/smart-walker-detects-obstacles; Aug. 20, 2001; 2 pages.

Graft, Birgit; "*An Adaptive Guidance System for Robotic Walking Aids*"; Journal of Computing and Information Technology—CIT 17; 2009; 12 pages.

Frizera et al.; "*The Smart Walkers as Geriatric Assistive Device. The SIMBIOSIS Purpose*"; Gerontechnology, vol. 7, No. 2; Jan. 30, 2008; 6 pages.

Rodriquez-Losada et al.; "*Guido, The Robotic Smart Walker for the Frail Visually Impaired*"; IEEE International Conference on Robotics and Automation (ICRA); Apr. 18-22, 2005; 15 pages.

Kayama et al.; "*Outdoor Environment Recognition and Semi-Autonomous Mobile Vehicle for Supporting Mobility of the Elderly and Disabled People*"; National Institute of Information and Communications Technology, vol. 54, No. 3; Aug. 2007; 11 pages.

Kalra et al.; "*A Braille Writing Tutor to Combat Illiteracy in Developing Communities*"; Carnegie Mellon University Research Showcase, Robotics Institute; 2007; 10 pages.

Blaze Engineering; "*Visually Impaired Resource Guide: Assistive Technology for Students who use Braille*"; Braille 'n Speak Manual; http://www.blaize.com; Nov. 17, 2014; 5 pages.

AppleVis; *An Introduction to Braille Screen Input on iOS 8*; http://www.applevis.com/guides/braille-ios/introduction-braille-screen-input-ios-8, Nov. 16, 2014; 7 pages.

Dias et al.; "*Enhancing an Automated Braille Writing Tutor*"; IEEE/RSJ International Conference on Intelligent Robots and Systems; Oct. 11-15, 2009; 7 pages.

D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.

Trinh et al.; "*Phoneme-based Predictive Text Entry Interface*"; Proceedings of the 16th International ACM SIGACCESS Conference on Computers & Accessibility; Oct. 2014; 2 pgs.

Merri et al.; "*The Instruments for a Blind Teacher of English: The challenge of the board*"; European Journal of Psychology of Education, vol. 20, No. 4 (Dec. 2005), 15 pages.

Kirinic et al.; "*Computers in Education of Children with Intellectual and Related Developmental Disorders*"; International Journal of Emerging Technologies in Learning, vol. 5, 2010, 5 pages.

Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.

Ebay; MATIN (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?hash=item41912d18c2:g:~pMAAOSwe-FU6zDa ; 4 pages.

Newegg; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.

Newegg; Motorola Behind the Neck Stereo Bluetooth Headphone Black/Red Bulk (S9)—OEM; http://www.newegg.com/Product/Product.aspx?Item=N82E16875982212&Tpk=n82e16875982212; 3 pages.

Zhang, Shanjun; Yoshino, Kazuyoshi; A Braille Recognition System by the Mobile Phone with Embedded Camera; 2007; IEEE.

Diallo, Amadou; Sep. 18, 2014; Apple iOS8: Top New Features, Forbes Magazine.

N. Kalar, T. Lawers, D. Dewey, T. Stepleton, M.B. Dias; Iterative Design of a Braille Writing Tutor to Combat Illiteracy; Aug. 30, 2007; IEEE.

\* cited by examiner

| | 400 | | | 402 | | | |
|---|---|---|---|---|---|---|---|
| IDENTIFICATION 404 | STORED DATA 406 | | RANK 420 | LABEL 422 | CONTACT INFO 424 | RULES 426 — 428 |
| SEARS | IMAGE DATA<br>LOCATION DATA | | 1 | JOE CELL | 555-555-1234 | ANYTIME |
| CAR | IMAGE DATA<br>AUDIO DATA | | 2 | JOE SKYPE | Joe@skype | M-F 9am-5pm |
| DOG | IMAGE DATA<br>AUDIO DATA | | 3 | DOUG CELL | 555-555-1345 | S-S 7am-11pm |
| STARBUCKS | IMAGE DATA<br>LOCATION DATA | | 4 | DOUG<br>PROPRIETARY | Doug@proprietary | ANYTIME |
| ⋮ | ⋮ | | ⋮ | | | |
| | | | N | HELP<br>CENTER | Help@proprietary | ANYTIME — 436 |

WEARABLE SMART DEVICE AND METHOD FOR REDUNDANT OBJECT IDENTIFICATION

BACKGROUND

1. Field

The present disclosure relates to a wearable smart device for providing environmental awareness for a user, and more particularly to redundant identification of objects in the user's environment.

2. Description of the Related Art

Systems currently exist in the art for object detection and recognition based on image data. These systems include a camera for detecting image data and a processor for identification of an object based on the image data. However, these systems are not optimized to assist blind individuals who would greatly benefit from adaptations of these systems. For example, these systems do not proactively collect data regarding the user's environment and proactively provide interpretations of the data to the user. Additionally, these systems do not provide redundant sources of object identification such that if the object cannot be identified based on a comparison of the image data to stored image data, the system could not identify the object.

Other systems exist in the art for providing remote instructions to blind individuals. These systems may include a wearable camera and a means for transmitting the image data to a remote operator. The remote operator may view the received data on a terminal and provide feedback to the user regarding the received data. The remote operator may be a professional and thus costs money, may be an individual and be annoyed by constant calls for identification of common objects and/or may not always be available to provide the instructions to the blind individuals. Additionally, the wearable camera and/or the means for transmitting the image data may be heavy or uncomfortable for the user.

Thus, there is a need for wearable smart devices and methods for redundant object identification.

SUMMARY

What is described is a wearable smart device. The wearable smart device includes a sensor configured to detect data corresponding to a detected object. The wearable smart device also includes a memory configured to store a contact list including contact information for a plurality of contact devices and to store stored data corresponding to a plurality of stored objects. The wearable smart device also includes an antenna and a processor. The processor is coupled to the sensor, the memory and the antenna. The processor is programmed to determine whether the detected object can be identified by comparing the detected data to the stored data. The processor is also programmed to transmit the detected data to at least one of the plurality of contact devices via the antenna in response to not being able to identify the detected object by comparing the detected data to the stored data. The processor is also programmed to receive an identification of the detected object from the at least one of the plurality of contact devices. The wearable smart device also includes an output unit coupled to the processor and configured to output the identification of the detected object.

Also described is a wearable smart device. The wearable smart device includes a sensor configured to detect data corresponding to a detected object. The wearable smart device also includes a memory configured to store a contact list including contact information for a plurality of contact devices and to store stored data corresponding to a plurality of stored objects. The wearable smart device also includes an antenna. The wearable smart device also includes a processor coupled to the sensor, the memory and the antenna. The processor is programmed to determine whether the detected object can be identified by comparing the detected data to the stored data. The processor is also programmed to establish a connection to one of the plurality of contact devices in response to determining that the detected data does not match the stored data. The processor is also programmed to transmit the detected data to the connected contact device. The processor is also programmed to receive an identification of the detected object from the at least one of the plurality of contact devices. The wearable smart device also includes an output unit coupled to the processor and configured to output the identification of the detected object.

Also described is a method for object identification by a wearable smart device. The method includes detecting, by a camera, image data corresponding to a detected object. The method also includes determining, by a processor, whether the detected object can be identified by comparing the image data to data stored in a memory. The method also includes outputting, by an output unit, an identification of the detected object in response to determining that the detected object can be identified by comparing the image data to the stored data. The method also includes transmitting, by the processor, the image data to a first contact device via an antenna in response to determining that the detected object cannot be identified by comparing the image data to the stored data. The method also includes determining, by the processor, whether the identification of the detected object has been received from the first contact device. The method also includes outputting, by the output unit, the identification of the detected object in response to determining that the identification of the detected object has been received from the first contact device. The method also includes transmitting, by the processor, the image data to a second contact device via the antenna in response to determining that the identification of the detected object has not been received from the first contact device. The method also includes determining, by the processor, whether the identification of the detected object has been received from the second contact device. The method also includes outputting, by the output unit, the identification of the detected object in response to determining that the identification of the detected object has been received from the second contact device.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 4 illustrates an exemplary memory that stores object data and a contact list according to an embodiment of the present invention;

DETAILED DESCRIPTION

Figure 1:
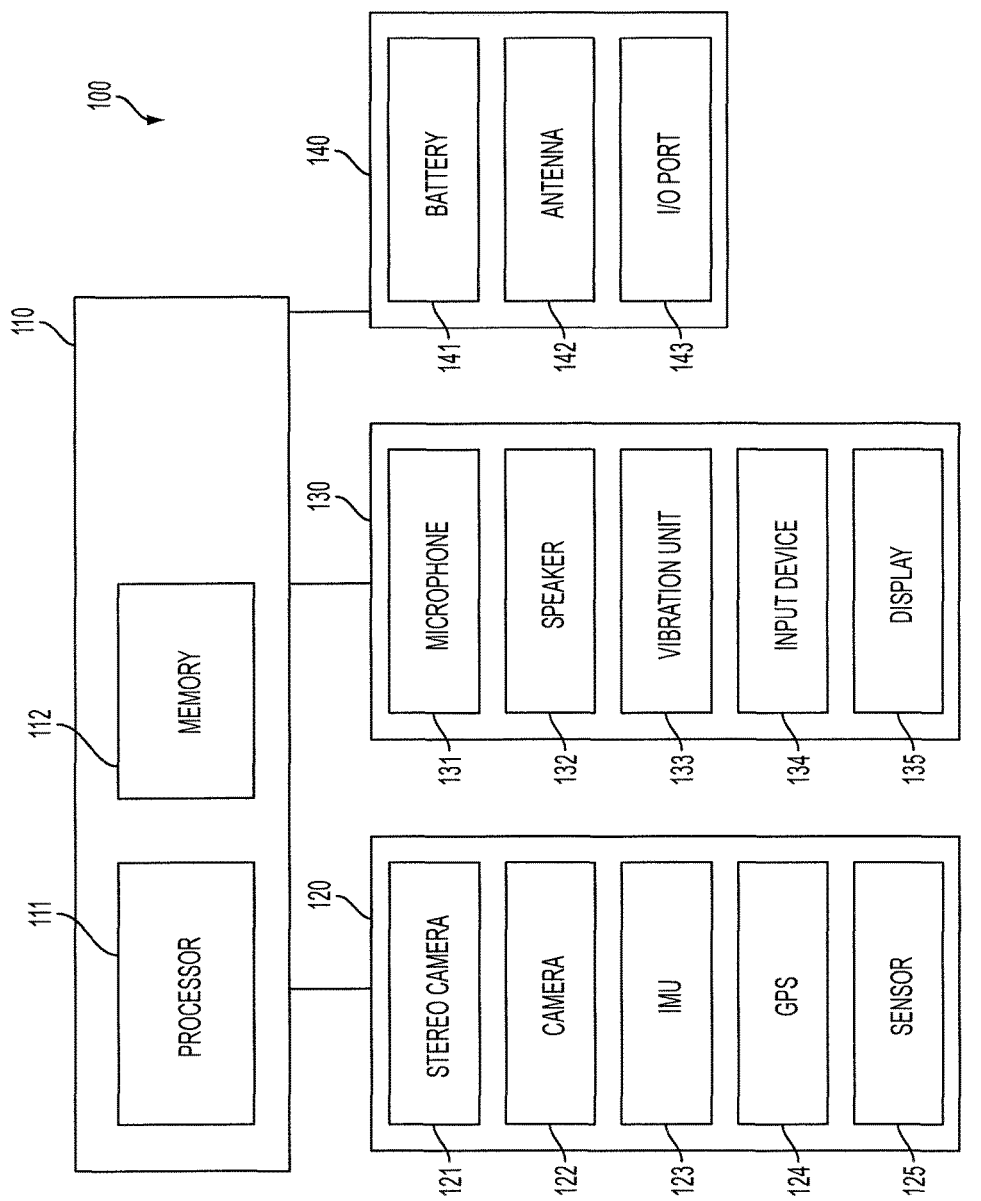
FIG. 1 is a block diagram of a wearable smart device capable of redundant object identification according to an embodiment of the present invention.

Disclosed herein is a wearable smart device and a method for providing redundant object recognition. The wearable smart device provides several benefits and advantages such as the ability to detect and identify objects. The objects may be identified in a number of manners such as searching a local memory, searching a crowdsourced database and/or establishing a connection with a device of another person so that the other person can review the data and provide identification of the objects to the user of the wearable smart device. Accordingly, the wearable smart device provides the user with redundant sources for object identification.

Having redundant sources for object identification provides benefits and advantages to the user such as a higher likelihood of identification of an object, a higher accuracy of identification and a lower cost of use. For example, the wearable smart device may first attempt to identify the object using data in a local memory so that the results will be nearly instantaneous and no other person is disturbed or needed to help identify the object. If the wearable smart device is unable to identify the object using data in the local memory, the wearable smart device may then attempt to identify the object by comparing the data to data stored in a crowd-sourced database (e.g., in a cloud). If the wearable smart device is unable to identify the object using the crowd-sourced database, the wearable smart device will attempt to automatically connect to a person or an operator such that the person or the operator is able to help the user identify the object. Because common objects may be stored in the memory or the cloud, the person or the operator will have to answer less calls regarding these common objects. The wearable smart device provides the additional advantage of having an up-to-date database as any user of a similar wearable smart device can update the crowd-sourced database with currently detected data.

An exemplary wearable smart device includes a camera capable of detecting image data regarding an object for identification. The wearable smart device also includes a memory for storing image data corresponding to various objects. The wearable smart device also includes a processor for comparing the detected image data to the stored image data to determine if the detected image data can be identified. The wearable smart device further includes an antenna for transmitting and receiving data from the cloud and other devices. The processor can attempt to connect to the other device when the object cannot be identified using the data in the memory so that a user of the other device can provide an identification of the object. Similarly, the processor can attempt to connect to the cloud when the object cannot be identified using the data in the memory or the wearable smart device cannot connect to the other device. The processor can also update the stored data in the memory and/or the cloud database with the detected data and the identification data so that the memory and/or the cloud contain up to date information.

In one implementation and with reference to FIG. 1, a wearable smart device 100 includes an onboard processing array 110 which communicates with a sensor array 120, an interface array 130 and a component array 140. The onboard processing array 110, the sensor array 120, the interface array 130 and the component array 140 are exemplary groupings to visually organize the components of the wearable smart device 100 in the block diagram of FIG. 1 and are not limiting or necessarily representative of any physical groupings. In addition, certain implementations may have more or less components than illustrated in FIG. 1.

The onboard processing array 110 includes a processor 111 and a memory 112. The processor 111 may be a computer processor such as an ARM processor, DSP processor, distributed processor or other form of central processing. The processor 111 may be positioned on the wearable smart device 100, may be a remote processor or it may be a pairing of a local and a remote processor.

The memory 112 may be one or any combination of the following: a RAM or other volatile or nonvolatile memory, a non-transitory memory or a data storage device, such as a hard disk drive, a solid state disk drive, a hybrid disk drive or other appropriate data storage. The memory 112 may further store machine-readable instructions which may be loaded into the memory 112 and executed by the processor 111. As with the processor 111, the memory 112 may be positioned on the wearable smart device 100, may be positioned remote from the wearable smart device 100 or may be a pairing of a local and a remote memory.

The sensor array 120 includes stereo cameras 121, a camera 122, an inertial measurement unit (IMU) 123, a global positioning system (GPS) 124 and a sensor 125. The stereo cameras 121 may be a stereo camera pair comprising two cameras offset by a stereo distance. The IMU 123 may be an IMU which may further comprise one or more of an accelerometer, a gyroscope, a magnetometer or the like. The GPS 124 may be one or more GPS units. The sensor 125 may be one or more sensors which provide further information about the environment in conjunction with the rest of the sensor array 120 such as one or more of a camera, a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, a light sensor or other sensor.

The interface array 130 includes a microphone 131, a speaker 132, a vibration unit 133, an input device 134 and a display 135. The microphone 131 may be a microphone or other device capable of detecting sounds, such as voice activation/commands or other voice actions from the user, and may be integrated with or external to the wearable smart device 100. The speaker 132 may be one or more speakers or other devices capable of producing sounds and/or vibrations. The vibration unit 133 may be one or more vibration motors or actuators capable of providing haptic and tactile output. In certain implementations, the vibration unit 133 may also be capable of producing sounds, such that the speaker 132 and the vibration unit 133 may be the same or integrated.

The input device 134 may be an input device such as a touch sensor, a plurality of buttons or the like. In various embodiments, the microphone 131 may be considered an input device, such that the term "input device" may refer to the microphone, a button or buttons, a touchpad, a touchscreen or the like.

The display 135 may be a display integrated into the wearable smart device 100 or wirelessly connected to the wearable smart device 100 and may include an LCD screen, a touchscreen, one or more LED's or the like. The display 135 may be capable of displaying visual data from the stereo cameras 121 and/or the camera 122 as well as other data.

The component array 140 includes a battery 141, an antenna 142 and an input/output port (I/O port) 143. The battery 141 may be a battery or other power supply capable of powering the wearable smart device 100. The antenna 142 may be one or more antennas capable of transmitting and receiving wireless communications. For example, the antenna 142 may be a Bluetooth or WiFi antenna, a radio frequency identification (RFID) antenna or reader and/or a near field communication (NFC) unit. The I/O port 143 may be one or more ports for connecting additional peripherals. For example, the I/O port 143 may be a headphone jack, a data port or the like. The I/O port 143 may also be used in conjunction with the antenna 142 to communicate with remote devices.

The antenna 142 and/or the I/O port 143 allows the wearable smart device 100 to connect to another device or network for data downloads, such as updates to the wearable smart device 100, map information or other relevant information for a particular application, and data uploads, such as status updates and updated map information. Further, the antenna 142 and/or the I/O port 143 allows the wearable smart device 100 to communicate with other devices such as computers, smartphones or the like. In this regard, image and other data detected by sensors of the wearable smart device 100 may be transmitted by the antenna 142 to the remote device and displayed or output on the device such as a parent or sibling's computer, a friend's smartphone or the like.

The wearable smart device 100 includes one or more features allowing the wearable smart device 100 to be worn by a user. In some embodiments, the wearable smart device 100 may be implemented as a necklace, an earpiece, eyeglasses, a smart watch, a smart clip or the like. The necklace may drape over a user's neck or shoulders, eyeglasses may rest on a user's nose and/or ears, the smart watch may be worn around a user's neck or wrist, the smart clip may be clipped onto the user or an article of clothing of the user, etc.

The wearable smart device 100 is capable of recognizing objects around the user and informing the user of the objects as they are recognized. This is particularly helpful for blind individuals who must rely on senses other than sight to obtain an understanding of their surroundings. The processor 111 may receive detected data, such as image data, and compare the detected data to a database in the memory 112 to identify objects in the user's environment. As used herein, an "object" may refer to a location, a person, a physical object, one or more characters of text or any other identifiable thing. In some embodiments, if a match cannot be found, the processor 111 may search a database shared with multiple smart devices that may include more identification data than the database in the memory 112. In some embodiments, if a match is not found in the shared database, the processor may transmit the detected data to a device in a contact list of the user, such as a parent's computer or a friend's smartphone so that the parent or friend can identify the object. If the object is identified, the processor 111 may update the database in the memory 112 and/or the shared database so that the object can be identified at a later time based on detected data.

Figure 2:
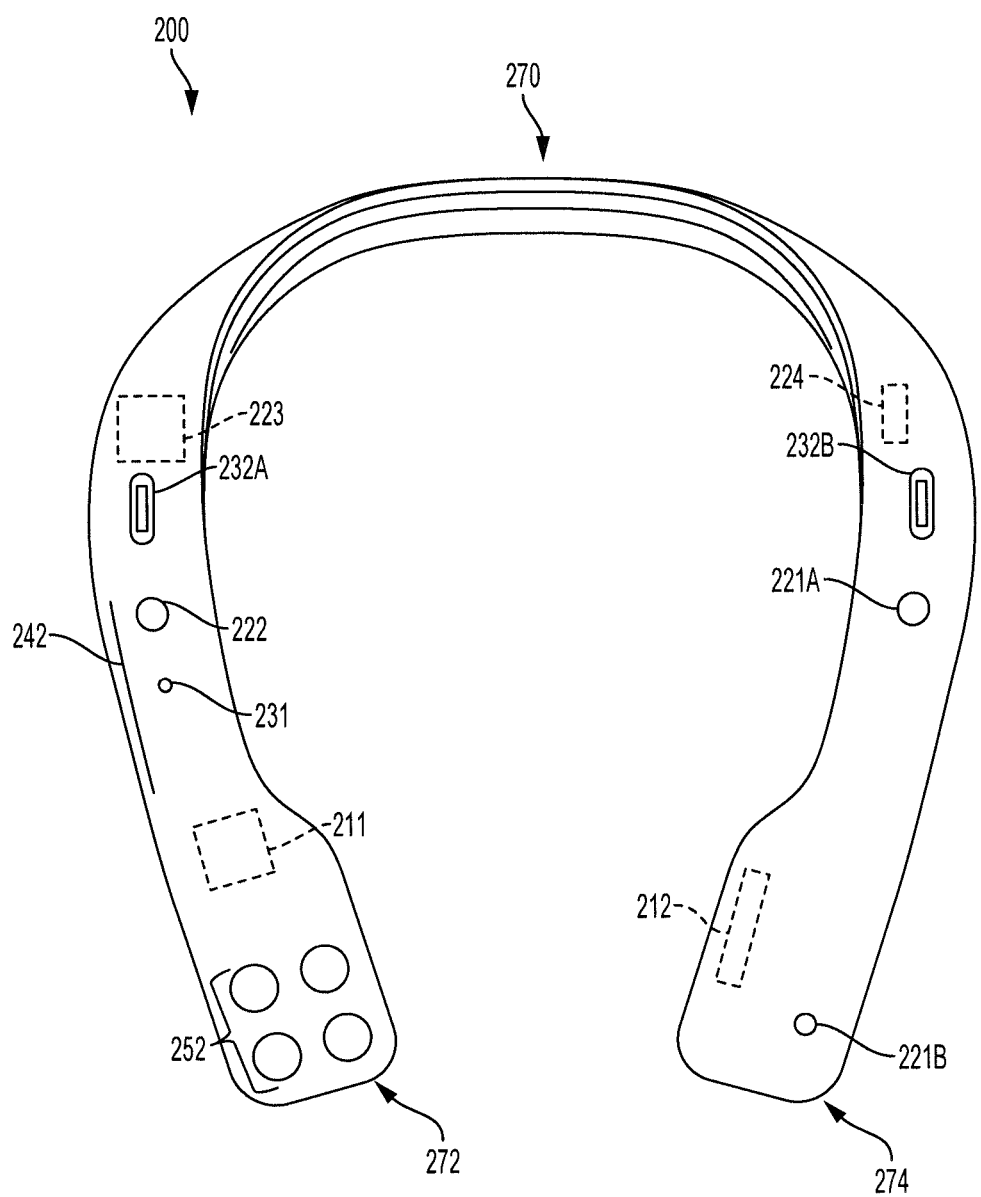
FIG. 2 illustrates a smart necklace capable of redundant object identification according to an embodiment of the present invention.

With reference now to FIG. 2, a wearable smart device may include a smart necklace 200. The smart necklace 200 may be designed to be worn around a user's neck such that a top portion 270 of the smart necklace 200 rests on the back of a user's neck and a first end 272 and a second end 274 may rest on a user's shoulders or chest. The smart necklace 200 may include a processor 211, a memory 212, buttons 252, a camera 222, a first stereo camera 221A, a second stereo camera 221B, a first output unit 232A, a second output unit 232B and an antenna 242.

The processor 211, memory 212, camera 222, stereo cameras 221A and 221B, the microphone 231 and the antenna 242 may have similar features as the corresponding components of the wearable smart device 100 of FIG. 1. The output units 232A and 232B may each include a speaker and/or a vibration unit such that the output units 232A and 232B may output audio and/or haptic feedback. The buttons 252 may be configured to operate as inputs to the smart necklace 200 such that a mode or operation of the smart necklace 200 can be changed by selecting one or more of the buttons 252.

Figure 3:
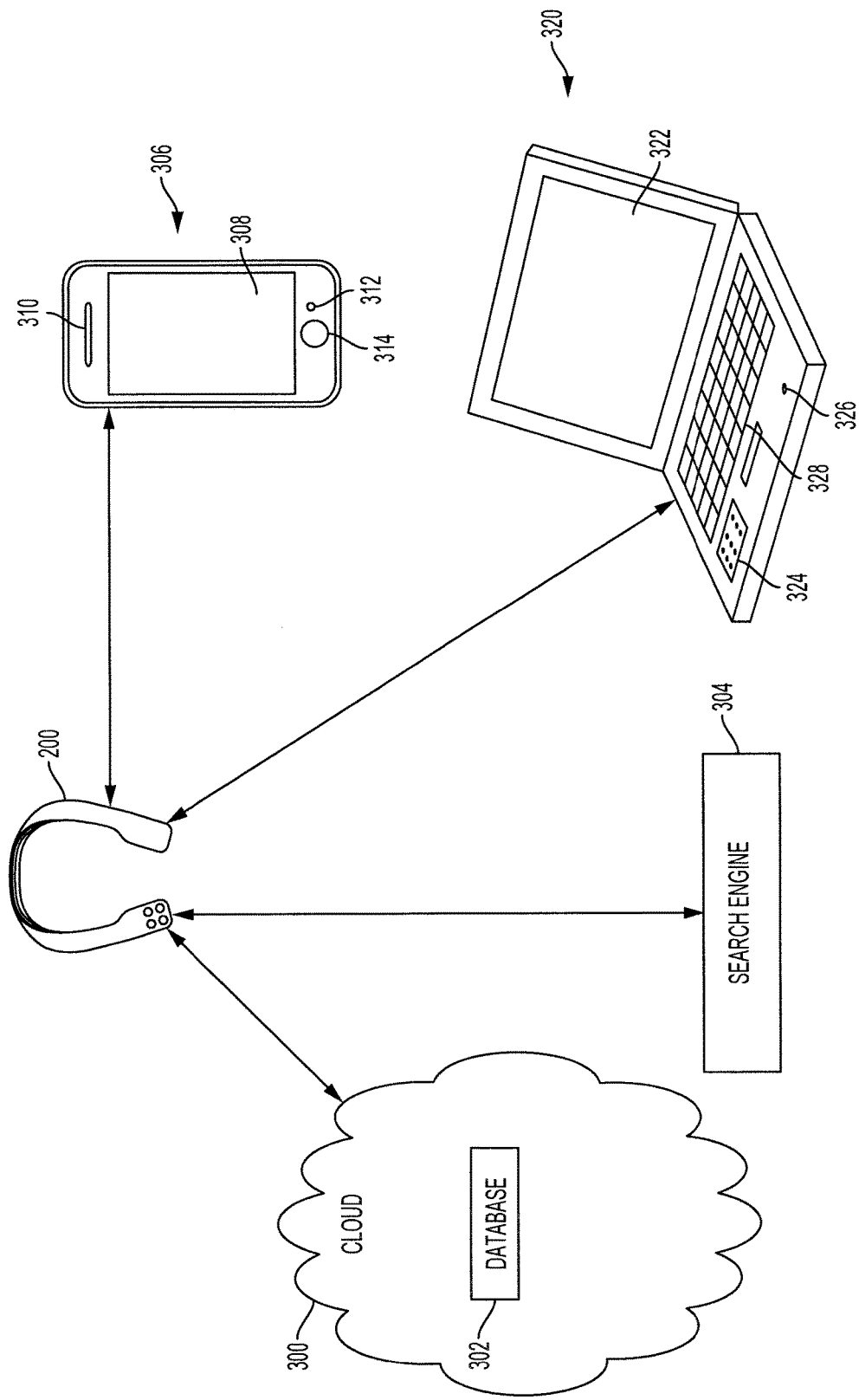
FIG. 3 illustrates the smart necklace of FIG. 2 connected to the cloud, a search engine, a laptop and a mobile device according to an embodiment of the present invention.

With reference now to FIG. 3, the smart necklace 200 may connect to a plurality of devices via the antenna 242. For example, the smart necklace 200 may connect to a cloud 300, a search engine 304, a laptop 320 and/or a mobile device 306. Connection may refer to an established connection, a set of data transmissions or the like. One skilled in the art will realize that the smart necklace 200 can communicate with a number and a variety of devices other than those illustrated in FIG. 3.

In some embodiments, the cloud 300 may include dedicated processing or memory that is available for the sole use of the smart necklace 200 such that it is considered part of the processor 211 or the memory 212. In some embodiments, the cloud 300 may instead or additionally include a database 302 accessible by a number of smart devices including the smart necklace 200. In this regard, data in the database 302 may be crowd sourced from the smart necklace 200 and the other smart devices. The database 302 may include image data, audio data, text data, location data and/or the like that correspond to a plurality of objects. The database 302 may also include a label for each of the plurality of objects such that the processor 211 may identify an object by comparing detected data to stored data.

The search engine 304 may be any search engine capable of searching websites, articles or the like based on at least one of text data, image data, audio data or location data. In this manner, the smart necklace 200 may detect data and transmit the detected data to the search engine 304 which in turn searches for a match of the detected data and may output information corresponding to any matched data.

The laptop 320 may be any laptop or computer having a connection means (such as a Wi-Fi connection), an input means (such as keyboard 328 or microphone 326) and an output means (such as a display 322 or a speaker 324). In that regard, the smart necklace 200 may transmit data corresponding to an object that was detected by one or more of its sensors to the laptop 320 such that the laptop 320 outputs the data to a user via the display 322 or the speaker 324. The user of the laptop 320 may receive this detected data, identify the object and provide an identification of the object to the user of the smart necklace 200 via the keyboard and/or the microphone 326 of the laptop 320.

In a manner similar to the laptop 320, the mobile device 306 may be any mobile device, such as a smartphone or a tablet, having a connection means (such as a wireless data connection), an input means (such as an input device 314 or a touchscreen 308) and an output means (such as a speaker 310 or the touchscreen 308). In that regard, the smart necklace 200 may transmit data corresponding to an object that was detected by one or more of its sensors to the mobile device 306 such that the mobile device 306 outputs the data to a user via the touchscreen 308 and/or the speaker 310. The user of the mobile device 306 may receive this detected data, identify the object and provide an identification of the object to a user of the smart necklace 200 via the touchscreen 308 and/or the microphone 312 of the mobile device 306.

In an exemplary embodiment and with reference to FIGS. 2 and 3, a user of the smart necklace 200 may come across an object that he wishes to identify such as a person, a bus schedule, a store or the like. The user may indicate his desire to identify the object by, for example, speaking an instruction or selecting one of the buttons 252. The camera 222, stereo cameras 221A and 221B, microphone 231, GPS 224 and/or IMU 223 may detect data corresponding to the object to be identified. The processor 211 may compare the detected data to data stored in the memory 212 in order to determine if the object can be identified. If the object cannot be identified, the processor 111 may compare the detected data to data stored in the database 302 to determine if the object can be identified based on data in the database 302.

If the object can't be identified using the database 302, the smart necklace 200 may begin to communicate with devices of friends and/or family of the user of the smart necklace 200. In that regard, the memory 212 may store a contact list including devices to be contacted for identification of unknown objects. The contact list may or may not be ordered. Continuing the example, the mobile device 306 is prioritized over the laptop 320. The smart necklace 200 may open a communication channel with the other device, such as an audio and video connection, for sharing the detected data or it may transmit the detected data to the other device and await a response. The data may then be output by the mobile device 306 or the laptop 320 such that a user of the mobile device 306 or the laptop 320 may identify the source of the data. This identification may then be transmitted back to the smart necklace 200 by the mobile device 306 or the laptop 320.

The detected data and identification may then be stored in the database 302 and/or the memory 212 so that the object may later be identified by the smart necklace 200 or another smart device. In some embodiments, the detected data and identification data may not be accessible to other users from the database until at least one other user or smart device has confirmed the identification. In some embodiments, the detected data and identification data may not be accessible to other users until it has been verified by a device designated as a trusted device.

In certain situations, a user of the mobile device or the laptop 320 may not be able to identify the object. In these situations, the smart necklace 200 may attempt to contact the other devices in the contact list until a connection is established or a response is received. If no connection is established, response received or identification received from any of the available contact devices, the smart necklace 200 may transmit the detected data to the search engine 304 so that the search engine can search for an identification of the object or a partial data match. The smart necklace 200 may also transmit the detected data to the cloud 300 to determine if a partial match may be made. An exemplary partial data match may include an identity of a store but not a location of the particular franchise. If any match or partial match is made, the processor 211 of the smart necklace 200 may provide at least a partial identification of the object to the user. The smart necklace 200 may then store the detected data and the identification in the database 302 and/or the memory 212. In some embodiments, the smart necklace 200 may attempt to contact a contact device prior to any search of the cloud 302.

With reference now to FIG. 4, the memory 212 may include a first database 400 and a second database 402. One skilled in the art will realize that the first database 400 and the second database 402 are exemplary only and the structures and data illustrated in FIG. 4 may vary without changing the scope of this disclosure.

The first database 400 may include data and corresponding identifications. For example, the first database 400 may include a first column 404 that corresponds to identification data corresponding to objects and a second column 406 that corresponds to stored data that corresponds to each of the objects in the first column 404.

In a first entry 408, the object is a Target® store. The stored data corresponding to Target may include image data of Target's logo, image data corresponding to a building shape of a particular Target store, location data corresponding to a location of a particular Target store or the like. If a user of the smart necklace 200 wishes to identify the Target store, the user may select an identify mode of the smart necklace 200 by, for example, selecting one or more of the buttons 252. Data may be detected by the smart necklace 200 such as location data detected by the IMU 123, the GPS 124, the camera 222 and/or the stereo camera 221, audio data detected by the microphone 231 and/or image data detected by the camera 222 and/or the stereo cameras 221. The processor 211 may compare the detected location data, audio data and/or image data to data stored in the memory 212 to determine if a match can be made and determine that the detected data matches data stored corresponding to the Target identification. The smart necklace 200 may then provide the identification of Target to the user using the output unit 232A and/or the output unit 232B.

The second database 402 may include a contact list and information corresponding to each of the contacts. A first column 420 lists a preferred ranking of the contact devices such that a device having a rank of 1 will be contacted before a device having a rank of 2. In some embodiments, the smart necklace 200 may adjust the rankings based on a ratio of successful attempts to connect with each particular device to unsuccessful attempts. For example, devices with a higher connection ratio may be given a higher rank as they are more likely to be available for a connection at any given time.

A second column 422 includes labels for each contact device. The labels may be provided by a user of the smart necklace 200 or may be obtained in another manner. In some embodiments, the smart necklace 200 may obtain contact device information from a contact list of the user's mobile device, from a contact list of the user's social media account or the like.

The third column 424 includes contact information for each of the contact devices. In some embodiments, the contact information may include a phone number so that data may be communicated to the contact device via a data connection such as 3G, LTE or the like. In some embodiments, the contact information may include an email address, a voice over IP address, a VPN address, proprietary contact information or the like.

The fourth column 426 includes rules that apply to each particular contact device. For example, a user of one of the contact devices may request to be contacted only at specific times on that particular device. The fourth column 426 will include these rules to ensure that the smart necklace 200 only attempts to contact devices at appropriate times.

Exemplary entries are shown in the second database 402. The first entry 428 corresponds to Joe's cellphone. Accordingly, its label is Joe Cell. Joe's cellphone is ranked number 1 indicating that it is the first device to contact if it is appropriate to contact Joe's cell at the particular time based on the rules. The contact information for Joe's cell includes a phone number so that the smart necklace 200 can connect to Joe's cell via the phone number. The rules indicate that Joe's cell can be contacted at any time.

A help center may be available such that a smart device may contact the help center for identification help if no other contacts are available. Accordingly, an Nth entry 436 corresponds to a help center. In FIG. 4, the Nth entry 436 is ranked at the end of the rankings meaning that it will be contacted last on the list. In some embodiments, the Nth entry 436 may have any ranking. The Nth entry 436 includes a label of Help Center as it corresponds to the help center and proprietary contact information.

Figure 5:
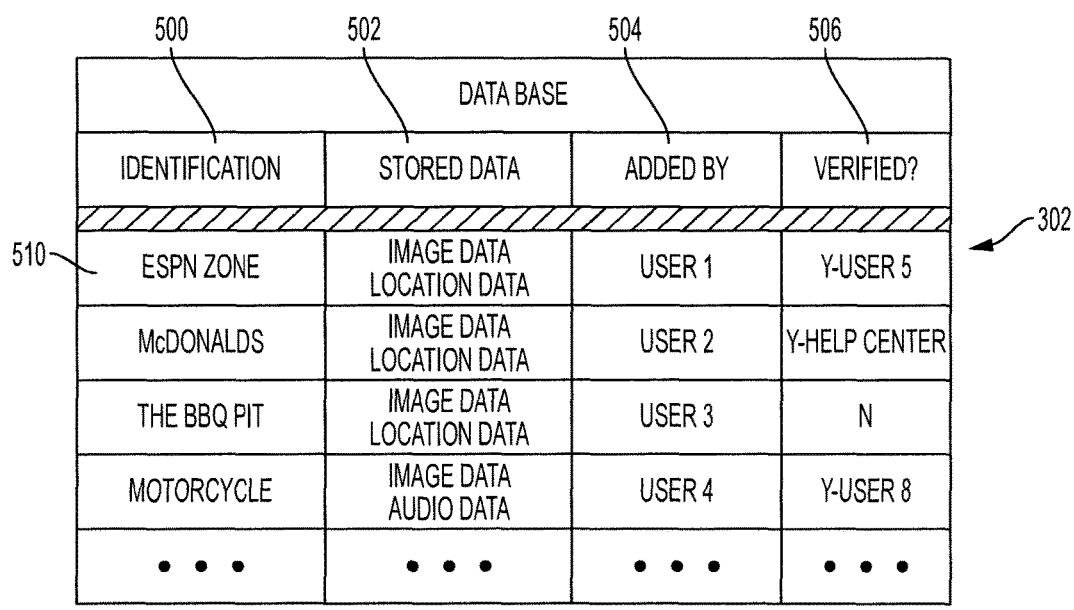
FIG. 5 illustrates an exemplary database on the cloud that stores crowd sourced object data according to an embodiment of the present invention.

With reference now to FIG. 5, exemplary entries are illustrated in the database 302. One skilled in the art will realize that the database 302 is exemplary only and the structures and data illustrated in FIG. 5 may vary without changing the scope of this disclosure The database 302 includes four columns. A first column 500 includes identification information corresponding to an object. A second column 502 includes stored data associated with the object or location. The smart necklace 200 or another wearable smart device may use the stored data to identify the object or location. In this regard, the first column 500 and the second column 502 are similar to the first column 404 and the second column 406 of the first database 400 of the memory 212.

Unlike the first database 400, the database 302 may be accessed and/or updated by more than the smart necklace 200 alone. In that regard, a third column 504 identifies the user that stored or updated the data corresponding to the particular entry. In some embodiments, an entry may not be accessible by a device until the entry has been verified by another smart device. Accordingly, a fourth column 506 indicates whether the entry has been verified. In some embodiments, the fourth column 506 may also indicate the user of the verification device. This may desirable as some devices may be trusted devices such that a single verification by that device is sufficient verification while other, non-trusted devices, may not be able to verify an entry by itself.

Database 302 includes five exemplary entries. A first entry 510 corresponds with a particular location of an ESPN zone. The first entry 510 includes image data and location data corresponding to the particular ESPN zone franchise. In that regard, the smart necklace 200 may detect image data and location data that corresponds to the particular ESPN zone franchise and the processor 211 may compare the detected data to the stored data and identify the object as the ESPN zone franchise. The first entry 510 was added by user 1 and was verified by user 5.

Figure 6:
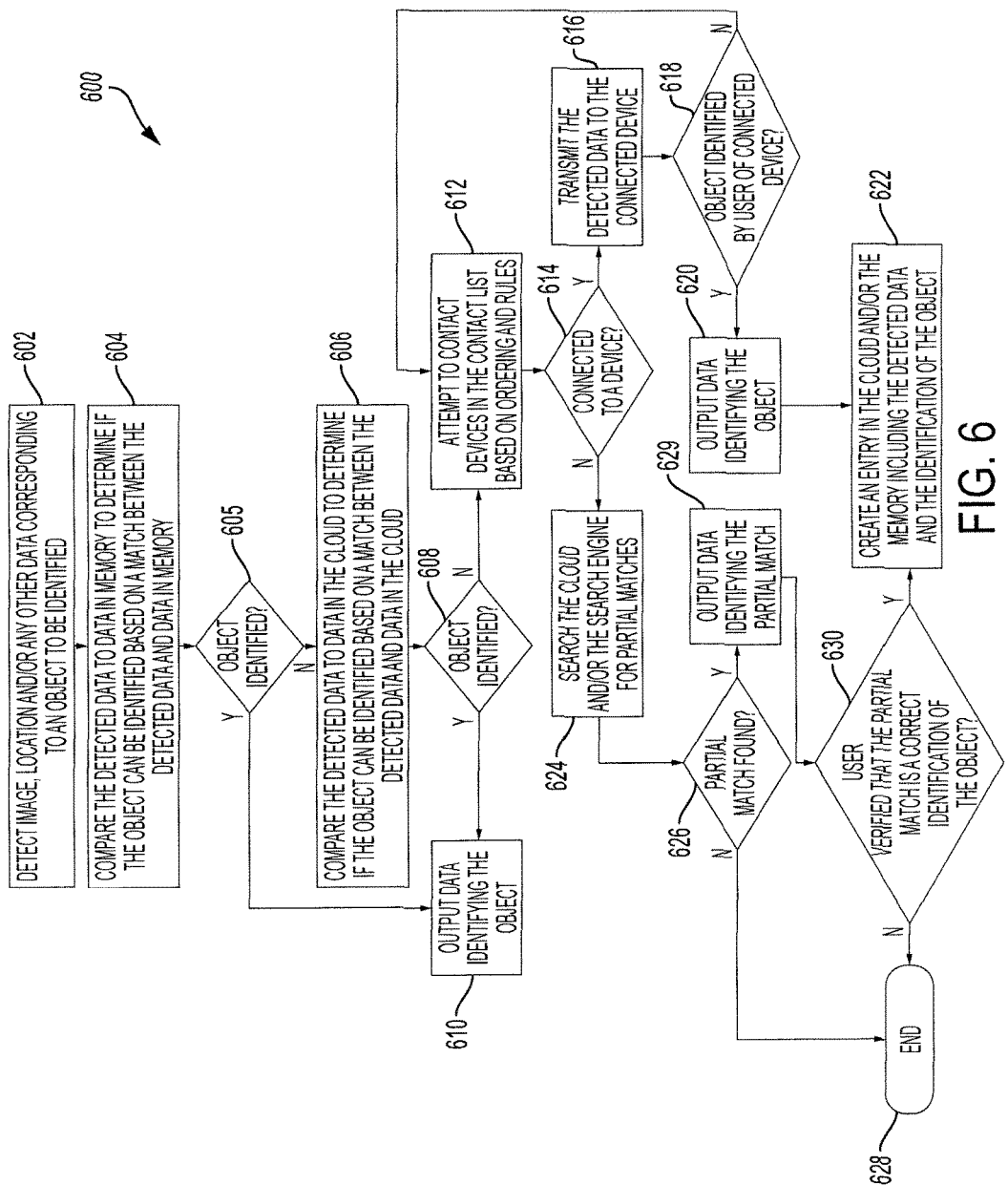
FIG. 6 illustrates an exemplary method for redundant object identification according to an embodiment of the present invention.

With reference now to FIG. 6, a method 600 may be performed by a wearable smart device such as the wearable smart device 100 and/or the smart necklace 200 for identification of objects. In block 602, the wearable smart device may determine that an object is to be identified and detect image data, audio data, location data and/or any other data that corresponds to the object. This data may be detected by any sensor of the wearable smart device such as a camera, a GPS, an IMU, a microphone or the like.

In block 604, a processor of the wearable smart device may compare the detected data to data in a memory similar to the first database 400 of the memory 212 in order to identify the object. In block 605, the processor determines whether the object or location has been identified. If the object or location has been identified, the wearable smart device may output data identifying the object or location in block 610.

If the object could not be identified by comparing the detected data to data in the memory, the processor may, in block 606, compare the detected data to data in the cloud, such as a database similar to the database 302, to determine if the object can be identified. In block 608, if the object was identified based on a match between the detected data and data in the cloud, then the wearable smart device may output object identification data in block 610.

If the object was not identified using the memory or the cloud, the wearable smart device may begin to attempt to contact devices in the contact list of the wearable smart device in block 612. In some embodiments, the wearable smart device 612 may attempt to contact devices in the contact list prior to searching the cloud for an identification of the object.

As discussed with reference to FIG. 4, the wearable smart device may attempt to contact the contact devices based on rankings and rules and continue to attempt to contact devices in the contact list until all acceptable contact devices (i.e., a contact device is acceptable if it is not against a rule to contact it at the particular time) in the contact list have been exhausted. An attempt to connect to a contact device may include transmitting a connection request and/or transmitting data to the contact device. A response may or may not be received. Examples of a received response include a confirmation to establish a connection, a response including identification data identifying the detected object or the like. Examples of a non-received response may include a lack of confirmation to establish a connection, a lack of identification data within a predetermined amount of time, a denial of the connection request or the like.

When a response is received (i.e., establishing a connection or data including an identification of the object) or no response is received from all acceptable contact devices, the method 600 may proceed to block 614. In block 614, the processor may determine whether the wearable smart device has connected to one of the contact devices.

In block 616, if the wearable smart device has connected to one of the contact devices, then the wearable smart device may transmit the detected data to the connected device. In some embodiments, the detected data may have been transmitted to the contact device during the attempt to contact the contact device. The detected data that is transmitted may include one or more of a data capture such as a picture, data captured over a period of time such as a video, live data such as a video stream or the like.

In block 618, the processor may determine whether the object has been identified by the user of the connected device. This determination may be made based on data received at the wearable smart device either via a connection or return message. For example, the received data may include an audio identification of the object, may include a text identification of the object, may include data indicating that the user cannot identify the object or the like. If the object has not been identified by a user of the contact device then the method 600 may return to block 612 in which the wearable smart device may attempt to contact other devices in the contact list until all contacts have been exhausted.

In block 620, if the object was identified by a user of the contact device then the wearable smart device may output data identifying the object. For example, a user of the contact device may speak an identification of the object that is detected by its microphone or type an identification that is detected by its keyboard or touchscreen. The wearable smart device may then provide that audio data to the user. The wearable smart device may change the format of the received identification data (i.e., from text to audio) before outputting the identification data to the user.

In block 622, the processor of the wearable smart device may create an entry in the cloud and/or the memory including the detected data and the identification data. In that regard, the wearable smart device and/or other wearable smart devices may access the data stored in the cloud in order to identify the object using data detected at a later time. In some embodiments, the wearable smart device may change the format of the received identification data (i.e., from audio to text) before storing the identification data.

In block 624, if the wearable smart device was unable to connect to a contact device or exhausted the list of contact devices without identifying the object, then the processor of the wearable smart device may search the cloud for a partial match of the detected data and/or use the search engine to search for a full or partial match of the detected data.

In block 626, the processor may determine if a match or partial match has been found using the cloud and/or the search engine. If a match or partial match was not found using the cloud or the search engine then the method 600 will end in block 628.

If a match or partial match was found using the cloud and/or the search engine then the method 600 may proceed to block 629 where the data identifying the partial match is provided to the user. This data may include the identification of the object, the identification of any other objects having a partial match to the detected data, the likelihood each identification is correct or the like.

In block 630, the user may provide feedback verifying whether the identification was correct or, if more than one identification was provided, which identification was correct. In some embodiments, the user may be able to provide verification of whether the match or partial match was correct by, for example, providing input to the wearable smart device. In that regard, the processor may determine whether the user verified that the match or partial match is a correct identification of the object in block 630. In some embodiments, block 630 may not exist such that if a match or partial match was found in block 626 the method may proceed either to block 620 or to block 628.

Figure 7A:
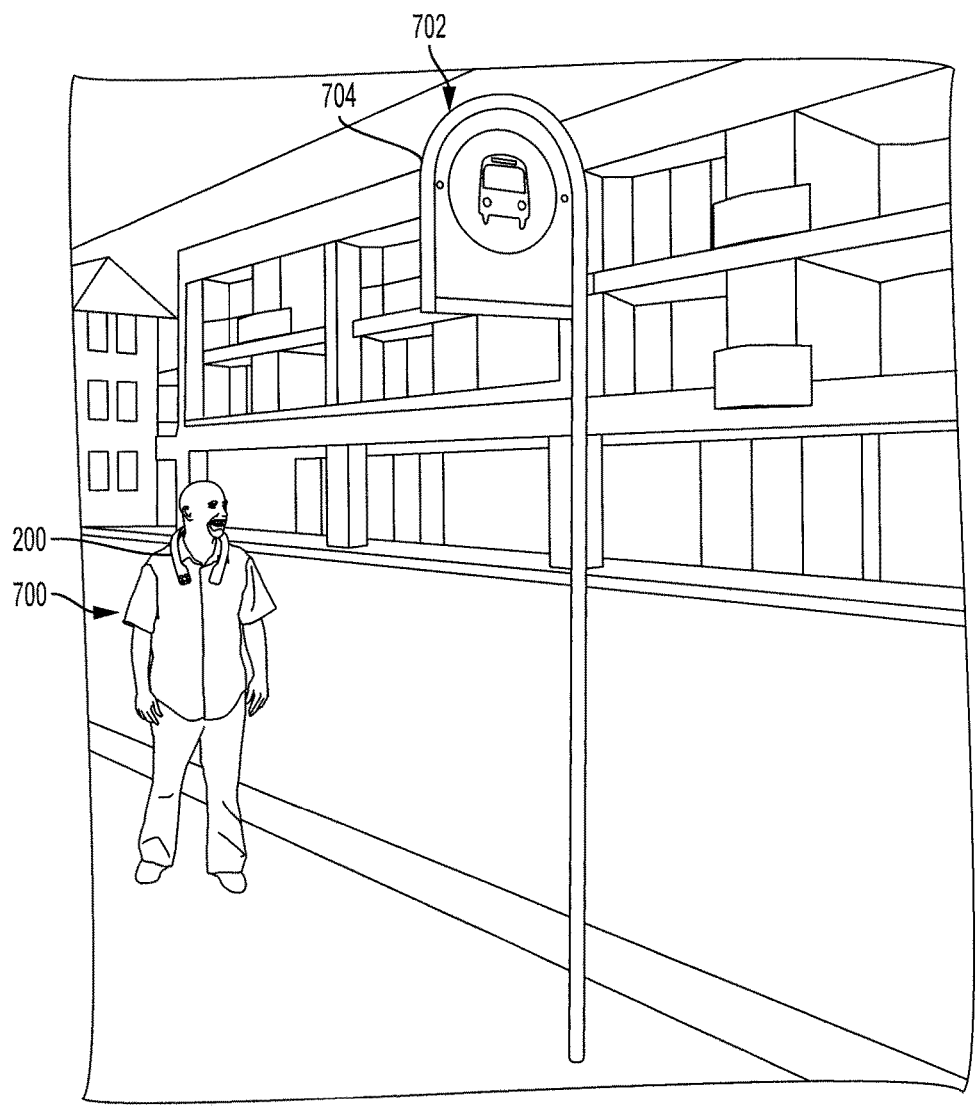
FIG. 7A illustrates an exemplary use of a method similar to the method of FIG. 6 according to an embodiment of the present invention.
Figure 7B:
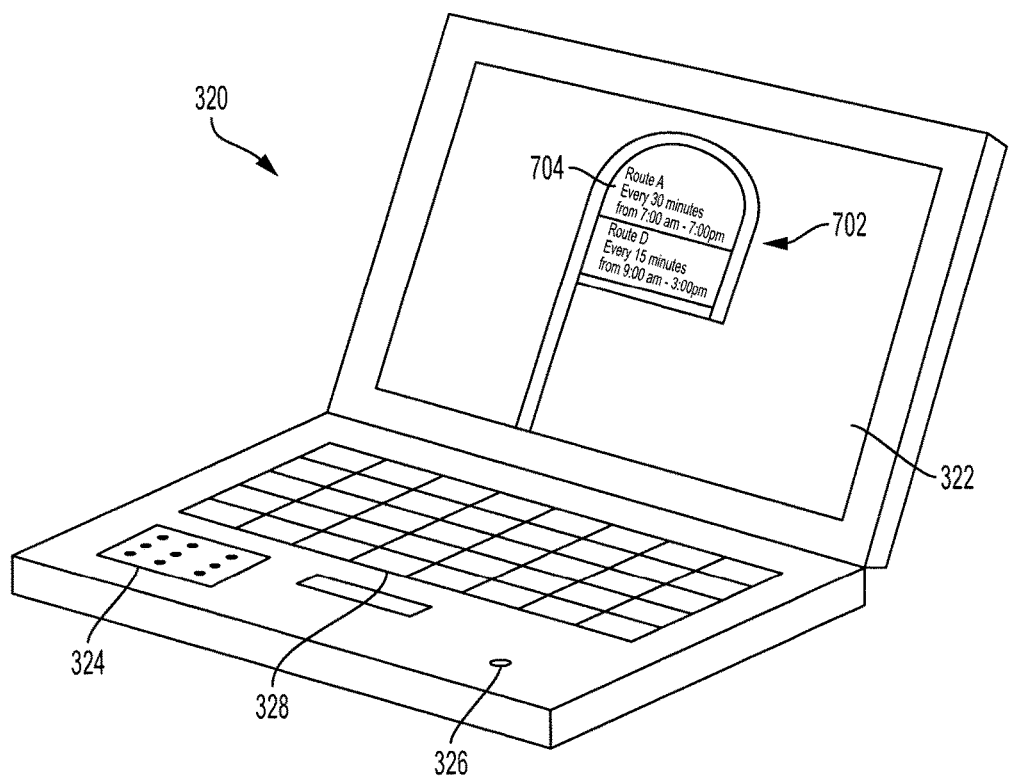
FIG. 7B continues the illustration of the exemplary use of FIG. 7A according to an embodiment of the present invention.

With reference now to FIGS. 7A and 7B, a user 700 is wearing the smart necklace 200 while walking down the street. The smart necklace 200 may be performing a method similar to the method 600. The user 700 may approach a bus sign 702 not knowing whether bus sign 702 corresponds to a bus route that the user should take. As the user 700 approaches the bus sign 702, the user may indicate that he wishes to identify the information on a front 704 of the bus sign 702. The processor 211 of the smart necklace 200 may compare data detected from sensors of the smart necklace 200 (such as from the camera 222) to data stored in the memory 212 and/or the database 302. The processor 211 may determine that the information on the front 704 of the bus sign 702 cannot be identified by comparing the detected data to the data in the memory or the database 302. The processor 211 may then begin to try to connect to contact devices and eventually establish a connection with the laptop 320.

The data detected by the smart necklace 200 may include image data detected by the camera 222 corresponding to the front 704 of the bus sign 702. This image data may be then displayed on the display 322 of the laptop 320. A user of the laptop 320 may review the information on the front 704 of the bus sign 702 and provide the bus route information to the user of the smart necklace 200 by speaking into the microphone 326.

The smart necklace 200 may then output the audio data to the user of the smart necklace 200. The smart necklace 200 may also save image data corresponding to the front 704 of the bus sign 702 and the audio data in the memory 212 and the database 302 such that the smart necklace 200 and other wearable smart devices can later identify the data on the front 704 of the bus sign 702. In some embodiments, the smart necklace 200 may also store location data in the memory and the database 302 to assist in the identification of the data on the bus sign 702.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wearable computing device comprising:
   a sensor configured to detect data corresponding to a detected object;
   a memory configured to store a contact list including contact information for a plurality of contact devices and to store stored data corresponding to a plurality of stored objects;
   an input device configured to receive user input;
   an antenna;
   a processor coupled to the sensor, the memory, the input device, and the antenna and configured to:
      assign a ranking to at least two of the plurality of contact devices based on a connection ratio corresponding to a ratio of successful connection attempts to unsuccessful connection attempts such that a first contact device has a higher ranking than a second contact device that has a lower connection ratio than the first contact device,
      determine whether the detected object can be identified by comparing the detected data to the stored data,
      transmit the detected data to the first contact device of the plurality of contact devices via the antenna if the detected object is unidentified after comparing the detected data to the stored data, the detected data being transmitted to the first contact device prior to the second contact device due to the higher ranking of the first contact device,
      transmit the detected data to the second contact device of the plurality of contact devices via the antenna if the detected object is unidentified after expiration of a predetermined amount of time since the detected data was transmitted to the first contact device, receive an identification of the detected object from at least one of the first contact device or the second contact device, receive the user input from the input device indicating whether the identification correctly corresponds to the detected object, and create an entry in the memory including the identification of the detected object and the detected data when the user input from the input device verifies that the identification correctly corresponds to the detected object; and an output unit coupled to the processor and configured to output the identification of the detected object.

2. The wearable computing device of claim 1 wherein the memory is further configured to store a first rule corresponding to the first contact device indicating that the first contact device is to only be contacted during a predetermined time of day and the processor is configured to avoid transmitting the detected data to the first contact device when a current time of day is outside of the predetermined time of day.

3. The wearable computing device of claim 1 wherein the processor is further configured to:

connect to a cloud database via the antenna if the detected object is unidentified after comparing the detected data to the stored data, the cloud database being accessible by a plurality of computing devices and having cloud data corresponding to a plurality of cloud objects; and attempt to identify the detected object by comparing the detected data to the cloud data.

4. The wearable computing device of claim 3 wherein the processor is further configured to transmit the detected data to the first contact device of the plurality of contact devices via the antenna if the detected object is unidentified after comparing the detected data to the cloud data.

5. The wearable computing device of claim 1 wherein the processor is further configured to:

determine whether the detected object can be identified by at least one of the plurality of contact devices;

transmit the detected data to a search engine in response to determining that the detected object cannot be identified by at least one of the plurality of contact devices; and receive the identification from the search engine.

6. A wearable computing device comprising:

a sensor configured to detect data corresponding to a detected object;

a memory configured to store a contact list including contact information for a plurality of contact devices and to store stored data corresponding to a plurality of stored objects;

an input device configured to receive user input;

an antenna;

a processor coupled to the sensor, the memory, the input device, and the antenna and configured to:

assign a ranking to at least two of the plurality of contact devices based on a connection ratio corresponding to a ratio of successful connection attempts to unsuccessful connection attempts such that a first contact device has a higher ranking than a second contact device that has a lower connection ratio than the first contact device, determine whether the detected object can be identified by comparing the detected data to the stored data, attempt to establish a first connection to the first contact device of the plurality of contact devices if the detected object is unidentified after comparing the detected data to the stored data, transmit the detected data to the first contact device if the first connection is established, attempt to establish a second connection to the second contact device of the plurality of contact devices if the first connection to the first contact device is unsuccessful, the attempt to establish the first connection to the first contact device occurring prior to the attempt to establish the second connection to the second contact device due to the higher ranking of the first contact device, transmit the detected data to the second contact device if the second connection is established, receive an identification of the detected object from the first contact device or the second contact device, receive the user input from the input device indicating whether the identification correctly corresponds to the detected object, and create an entry in the memory including the identification of the detected object and the detected data when the user input from the input device verifies that the identification correctly corresponds to the detected object; and an output unit coupled to the processor and configured to output the identification of the detected object.

7. The wearable computing device of claim 6 wherein the memory is further configured to store a first rule corresponding to the first contact device indicating that the first contact device is to only be contacted during a predetermined time of day and the processor is configured to avoid attempting to establish the first connection with the first contact device when a current time of day is outside of the predetermined time of day.

8. The wearable computing device of claim 6 wherein the processor is further configured to:

connect to a cloud database via the antenna if the detected object is unidentified after comparing the detected data to the stored data, the cloud database being accessible by a plurality of computing devices and having cloud data corresponding to a plurality of cloud objects; and determine whether the detected data can be identified by comparing the detected data to the cloud data.

9. The wearable computing device of claim 8 wherein the processor is further configured to attempt to establish the first connection with the first contact device of the plurality of contact devices via the antenna if the detected object is unidentified after comparing the detected data to the cloud data.

10. The wearable computing device of claim 6 wherein the processor is further configured to:

determine whether the detected object can be identified by at least one of the plurality of contact devices;

transmit the detected data to a search engine in response to determining that the detected object cannot be identified by at least one of the plurality of contact devices; and receive the identification from the search engine.

11. A method for object identification by a wearable computing device including:

detecting, by a camera, image data corresponding to a detected object;

determining, by a processor, whether the detected object can be identified by comparing the image data to data stored in a memory;

outputting, by an output unit, an identification of the detected object in response to determining that the detected object can be identified by comparing the image data to the stored data;

assigning, by the processor, a ranking to at least two contact devices of a plurality of contact devices based on a connection ratio corresponding to a ratio of successful connection attempts to unsuccessful connection attempts such that a first contact device has a higher ranking than a second contact device that has a lower connection ratio than the first contact device;

transmitting, by the processor, the image data to the first contact device via an antenna if the detected object is unidentified after comparing the image data to the stored data data, the image data being transmitted to the first contact device prior to the second contact device due to the higher ranking of the first contact device;

determining, by the processor, whether the identification of the detected object has been received from the first contact device;

outputting, by the output unit, the identification of the detected object in response to determining that the identification of the detected object has been received from the first contact device;

transmitting, by the processor, the image data to the second contact device via the antenna if the detected object is unidentified after expiration of a predetermined amount of time since the image data was transmitted to the first contact device;

determining, by the processor, whether the identification of the detected object has been received from the second contact device;

outputting, by the output unit, the identification of the detected object in response to determining that the identification of the detected object has been received from the second contact device;

receiving, by an input device, user input indicating whether the identification correctly corresponds to the detected object; and creating, by the processor, an entry in the memory including the identification and the image data after the identification has been received when the user input verifies that the identification correctly corresponds to the detected object.

12. The method of claim 11 further comprising:

transmitting, by the processor, the image data to a search engine via the antenna if the detected object is unidentified after expiration of a predetermined amount of time since the image data was transmitted to the second contact device; and receiving, from the search engine, the identification of the detected object.

13. The method of claim 11 further comprising:

determining, by the processor, whether the detected object can be identified by comparing the image data to cloud data stored in a cloud if the detected object is unidentified after comparing the image data to the stored data;

wherein transmitting the image data to the first contact device via the antenna is further performed if the detected object is unidentified after comparing the image data to the cloud data.

* * * * *